(12) United States Patent
Johnson et al.

(10) Patent No.: US 7,912,501 B2
(45) Date of Patent: Mar. 22, 2011

(54) AUDIO I/O HEADSET PLUG AND PLUG DETECTION CIRCUITRY

(75) Inventors: Timothy Johnson, San Jose, CA (US); Achim Pantfoerder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1061 days.

(21) Appl. No.: 11/650,132

(22) Filed: Jan. 5, 2007

(65) Prior Publication Data
US 2008/0164994 A1    Jul. 10, 2008

(51) Int. Cl.
*H04M 1/00* (2006.01)

(52) U.S. Cl. .................. 455/556.1; 455/575.2

(58) Field of Classification Search .......... 455/575.2, 455/557, 556.1, 550.1
See application file for complete search history.

(56) References Cited

U.S. PATENT DOCUMENTS

| | | | |
|---|---|---|---|
| 4,922,547 A * | 5/1990 | Murata | 455/79 |
| 5,794,163 A | 8/1998 | Paterson et al. | |
| 6,470,197 B1 | 10/2002 | Tuoriniemi et al. | |
| 6,615,059 B1 | 9/2003 | Pehrsson et al. | |
| 7,564,966 B2 * | 7/2009 | Sano | 379/419 |
| 2004/0175993 A1 | 9/2004 | Chennakeshu | |
| 2005/0090141 A1 | 4/2005 | Peng et al. | |
| 2007/0049103 A1 * | 3/2007 | Kashi et al. | 439/396 |
| 2008/0165986 A1 | 7/2008 | Daniels et al. | |
| 2008/0166003 A1 | 7/2008 | Hankey et al. | |

FOREIGN PATENT DOCUMENTS

EP    1199867 A1    4/2002
JP    2001169385    6/2001

OTHER PUBLICATIONS

PCT International Search Report and Written Opinion, International Application No. PCT/US2008/000177, International Filing Date—Apr. 1, 2008, (20 pages).

* cited by examiner

*Primary Examiner* — Tu X Nguyen
(74) *Attorney, Agent, or Firm* — Blakely, Sokoloff, Taylor & Zafman LLP

(57) ABSTRACT

A single prong, multiple signal conducting plug and plug detection circuitry is provided. The plug may be electrically coupled to a stereo headset including a microphone. The plug may include four signal conducting regions arranged in a predetermined order along the length of the prong. Detection circuitry may be operative to determine whether a microphone type of plug (e.g., a four region plug including a microphone region and two audio regions, or a three region plug including microphone region and only one audio region) or a non-microphone type of plug (e.g., stereo plug) is inserted into the jack of an electronic device (e.g., mobile phone). Detection circuitry may also detect user activated functions performed in response to user activation of one or more switches included with the headset. For example, the headset may include a single switch for performing a function with respect to a microphone (e.g., end-call function).

26 Claims, 17 Drawing Sheets

| $S_2$ | $S_1$ | Action |
|---|---|---|
| Open | Open | $S_2$ activated (MIC open event) |
| Closed | Open | Normal |
| Open | Closed | $S_2$ activated (MIC open event) |
| Closed | Closed | $S_1$ activated (MIC short event) |

AUDIO I/O HEADSET PLUG AND PLUG DETECTION CIRCUITRY

BACKGROUND OF THE INVENTION

This relates to portable electronic devices, and more particularly to headset plugs and plug detection circuitry.

Portable electronic devices may include jacks or sockets for receiving connector plugs (e.g., stereo plug) for headphones or headsets. Audio signals may be passed from the jack to the headset through electrical connections formed between the plug and the jack when the plug is inserted into the jack. Known jacks include single prong monaural and stereo plugs and double prong stereo plugs. A drawback of such plugs is that they lack the ability to handle additional signals which may be provided by either the headset or the jack. In addition, the double prong plug requires a double prong jack, which may occupy valuable real estate in the media device.

What is needed is a single prong plug capable of handling at least one additional signal in addition to one or more audio signals. What is also needed is plug detection circuitry to detect which type of plug is received in the jack and to detect user activated functions that may be performed with a headset connected to the plug.

SUMMARY OF THE INVENTION

A single prong, multiple signal conducting plug is provided. This plug may be electrically coupled to a stereo headset including a microphone. The plug may include four signal conducting regions arranged in a predetermined order along the length of the prong. As such, this plug may be referred to as a four region plug. The signal conducting regions include a left audio signal region, a right audio signal region, a ground region, and a microphone region, where the ground region is located between the microphone region and either the left or right audio signal regions.

Detection circuitry may be operative to determine whether a microphone type of plug (e.g., a four region plug including a microphone region and two audio regions, or a three region plug including a microphone region and only one audio region) or a non-microphone type of plug (e.g., stereo plug) is inserted into the jack of the electronic device (e.g., mobile phone). The detection circuitry may provide a signal that indicates whether the received plug is a microphone or non-microphone type. For example, when the plug is received, the signal may indicate that a microphone type of plug is received. Detection circuitry may provide another signal that indicates whether a plug is received by the jack. Both signals may be provided to other circuitry, such as a processor, within the electronic device for further processing.

Detection circuitry may also detect user activated functions performed in response to user activation of one or more switches included with the headset. For example, the headset may include a single switch for performing a function with respect to a microphone (e.g., end-call function). When the user presses the switch, the detection circuitry may detect the occurrence of a switch activation event and provide a signal indicative of that activation that switch to other circuitry (e.g., a processor) located in the device. In other embodiments, the headset may include multiple switches (e.g., two switches). The detection circuitry may detect which one of the switches is activated and provide a signal indicative of which switch is activated.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
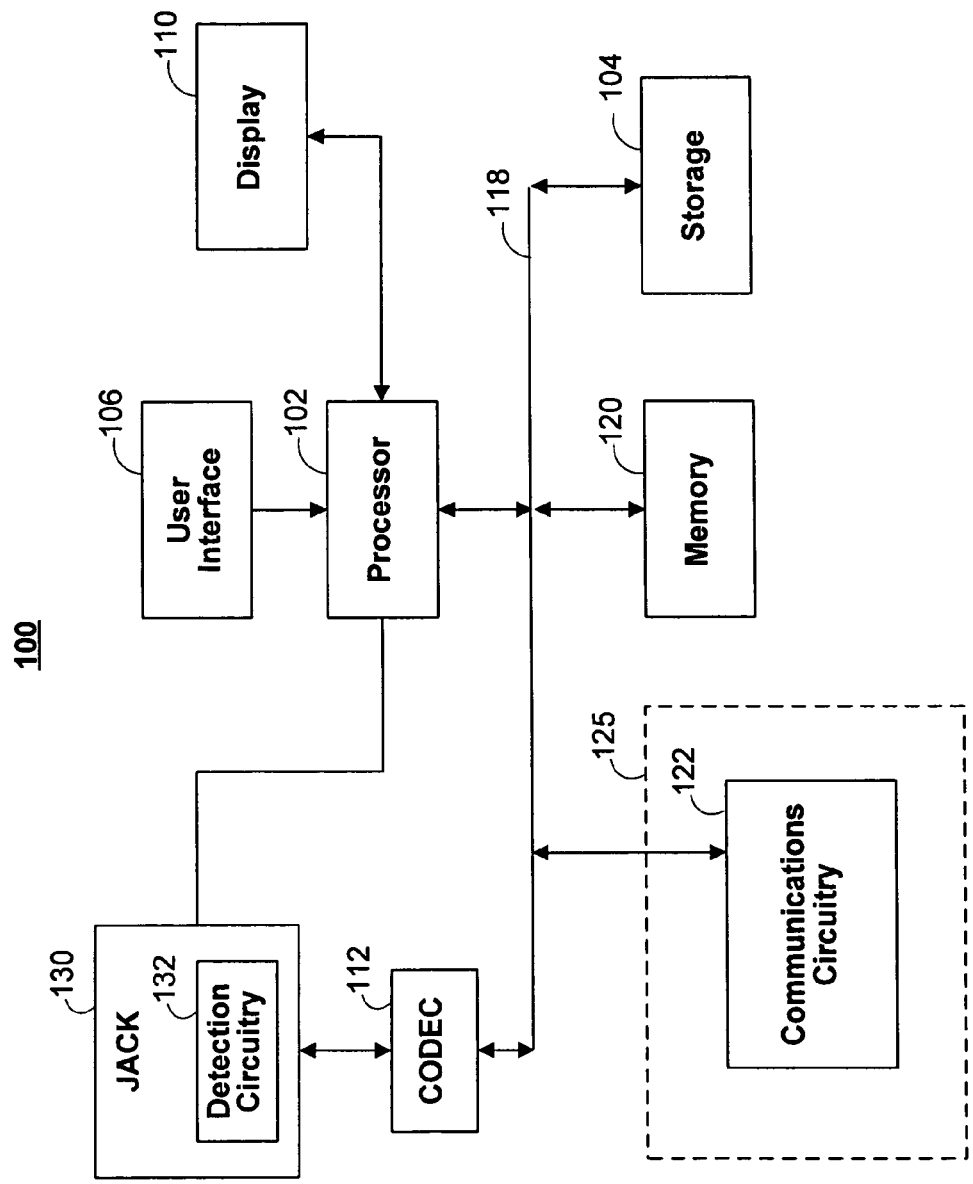
FIG. 1 shows a simplified block diagram of portable media player in accordance with an embodiment of the present invention.

FIG. 1 shows a simplified block diagram of illustrative portable electronic device 100 in accordance with the principles of the present invention. Device 100 may include processor 102, storage device 104, user interface 108, display 110, CODEC 112, bus 118, memory 120, communications circuitry 122, and jack 130. Processor 102 can control the operation of many functions and other circuitry included in media player 100. Processor 102 may drive display 110 and may receive user inputs from user interface 108.

Storage device 104 may store media (e.g., music and video files), software (e.g., for implementing functions on device 100, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that keeps tracks of podcasts or television shows or other media a user subscribes to), telephone information (e.g., telephone numbers), and any other suitable data. Storage device 104 may include one more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory may be provided for store firmware for device applications (e.g., operating system, user interface functions, and processor functions).

Bus 118 may provide a data transfer path for transferring data to, from, or between storage device 104, codec 112, communications circuitry 123, baseband circuitry 124, memory 120, and processor 102.

Coder/decoder (CODEC) 112 may be included to convert digital audio signals into an analog signal, which may be provided to jack 130. For example, CODEC 112 may provide audio signals (e.g., left and right audio signals to jack 130 to be converted into sound by a headset (not shown). In one embodiment, CODEC 112 may provide the left and right audio signals as single ended outputs. CODEC 112 may receive one or more signals from jack 130. For example, jack 130 may receive audio signals from a microphone included with a headset connected to the jack. In one embodiment, CODEC 112 may receive the microphone audio signals as a differential monaural input.

Jack 130 may be constructed to receive single prong plugs of a predetermined length and diameter. For example, jack 130 may receive four region plugs and three region plugs. The plugs may be connected to headsets that may provide microphone and mono or stereo functionality. If desired, the headsets may include integrated switches, that when activated, cause a function to be executed. Examples of headsets that include switches can be found, for example, in commonly assigned Eric Daniels et al. U.S. patent application Ser. No. 11/650,001, filed Jan. 5, 2007, entitled "Bend Switch for Wired Headset," and Evans Hankey et al. U.S. patent application Ser. No. 60/879,155, filed Jan. 6, 2007, entitled "Wired Headset with Integrated Switch," both disclosures of which are hereby incorporated by reference herein in their entireties.

In addition, jack 130 may include detection circuitry 132. Various embodiments of detection circuitry are discussed in more detail below. Jack 130 may be electrically coupled to processor 102 to transmit signals between jack 130 and processor 102. For example, detection circuitry 132 may provide a HEADSET DETECT signal and MIC signal to processor 102. The MIC signal may indicated the presence of headset having a microphone connected to jack 130 and may indicate when a microphone switch is activated. Processor 102 may interpret the signals received from detection circuitry 132 to determine, for example, which plug type is connected to jack 130 and whether a microphone switch is activated. In other embodiments, detection circuitry 132 may provide three or more signals to processor 102. For example, when a headset includes two or more switch functions, a signal conducting pathway may be need for each switch function, where one of the pathways may also be used to indicate to processor 102 whether a four region plug is inserted into jack 130.

Communications circuitry 122 may be included in a carrier circuitry portion (delimited by dashed lines 125) of device 100. Carrier circuitry portion 125 may be dedicated primarily to processing telephone functions and other wireless communications (e.g., Wi-Fi or Bluetooth). For example, baseband circuitry 124 may handle telephone functions. It is understood that the carrier circuitry portion operate independent of other device components operating in device 100. That is, carrier circuitry may be an independently operating subsystem within device 100 that may communicate with other components within device 100.

User interface 108 may allow a user to interact with the device 100. For example, the user input device 108 can take a variety of forms, such as a button, keypad, dial, a click wheel, or a touch screen. Communications circuitry 122 may include circuitry for wireless communication (e.g., short-range and/or long range communication). For example, the wireless communication circuitry may be wi-fi enabling circuitry that permits wireless communication according to one of the 802.11 standards or a private network. Other wireless network protocols standards could also be used, either in alternative to the identified protocols or in addition to the identified protocol. Another network standard may be Bluetooth.

Communications circuitry 122 may also include circuitry that enables device 100 to be electrically coupled to another device (e.g., a computer or an accessory device) and communicate with that other device. As indicated above, communications circuitry 122 may also include baseband circuitry for performing relatively long-range communications (e.g., telephone communications). If desired, communications circuitry 122 may include circuitry for supporting both relatively long-range and short-range communications. For example, communications circuitry 122 may support telephone, Wi-Fi, and Bluetooth communications.

In one embodiment, device 100 may be a portable computing device dedicated to processing media such as audio and video. For example, device 100 may be a media player (e.g., MP3 player), a game player, a remote controller, a portable communication device, a remote ordering interface, an audio tour player, a mobile telephone, or other suitable personal device. In another embodiment, media player 100 may be a portable device dedicated to providing media processing and telephone functionality in single integrated unit. Media player 100 may be battery-operated and highly portable so as to allow a user to listen to music, play games or video, record video or take pictures, place and take telephone calls, communicate with others, control other devices, and any combination thereof. In addition, device 100 may be sized such that it fits relatively easily into a pocket or hand of the user. By being handheld, device 100 is relatively small and easily handled and utilized by its user and thus may be taken practically anywhere the user travels.

Figure 2:
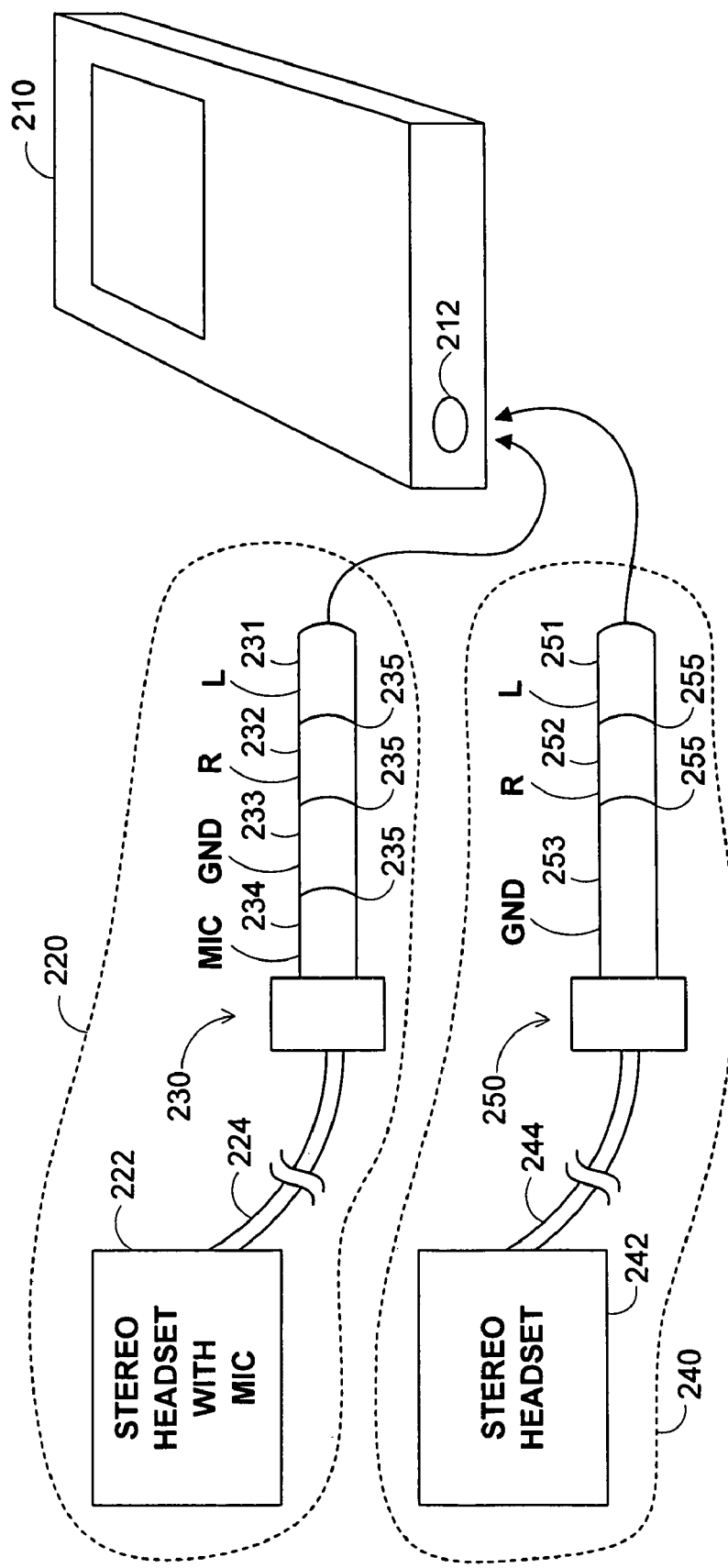
FIG. 2 shows an illustrative personal media device capable of receiving two different types of plugs in accordance with an embodiment of the present invention.

FIG. 2 shows an illustrative portable electronic device 210 capable of receiving two different types of plugs. As shown, plug 230 of headset system 220 and plug 250 of headphone system 240 may be inserted into jack 212. Headset system 220 can include stereo headset with a microphone 224 which is connected to four region plug 230 via wired link 224. Stereo headset with a microphone 224 may include left and right speakers and a microphone.

Plug 230 may include four signal conducting regions arranged in a predetermined order along the length of a single prong. As shown, plug 230 includes, starting from the tip of plug 230, a left audio signal region 231, a right audio signal region 232, a ground region 233, and a microphone region 234. The left and right audio signal regions may be interchanged, however, in this embodiment, ground region is located between the microphone region and the right audio signal region. The regions may be separated by insulating rings 235 that electrically isolate the regions from each other. The electrical connection of headset system 220 is discussed below in more detail in connection with FIG. 3 and a more detailed of four region plug is discussed below in connection with FIG. 4.

Headphone system 240 can include stereo headset 242 which is connected to plug 250 via wired link 244. Stereo headset 242 may include left and right speakers. Plug 250 includes, starting from the tip, a left audio signal region 251, a right audio signal region 252, and a ground region 253. The location of left and right audio regions 251 and 252 may be switched. The regions may be isolated from each by insulating rings 255

Figure 3:
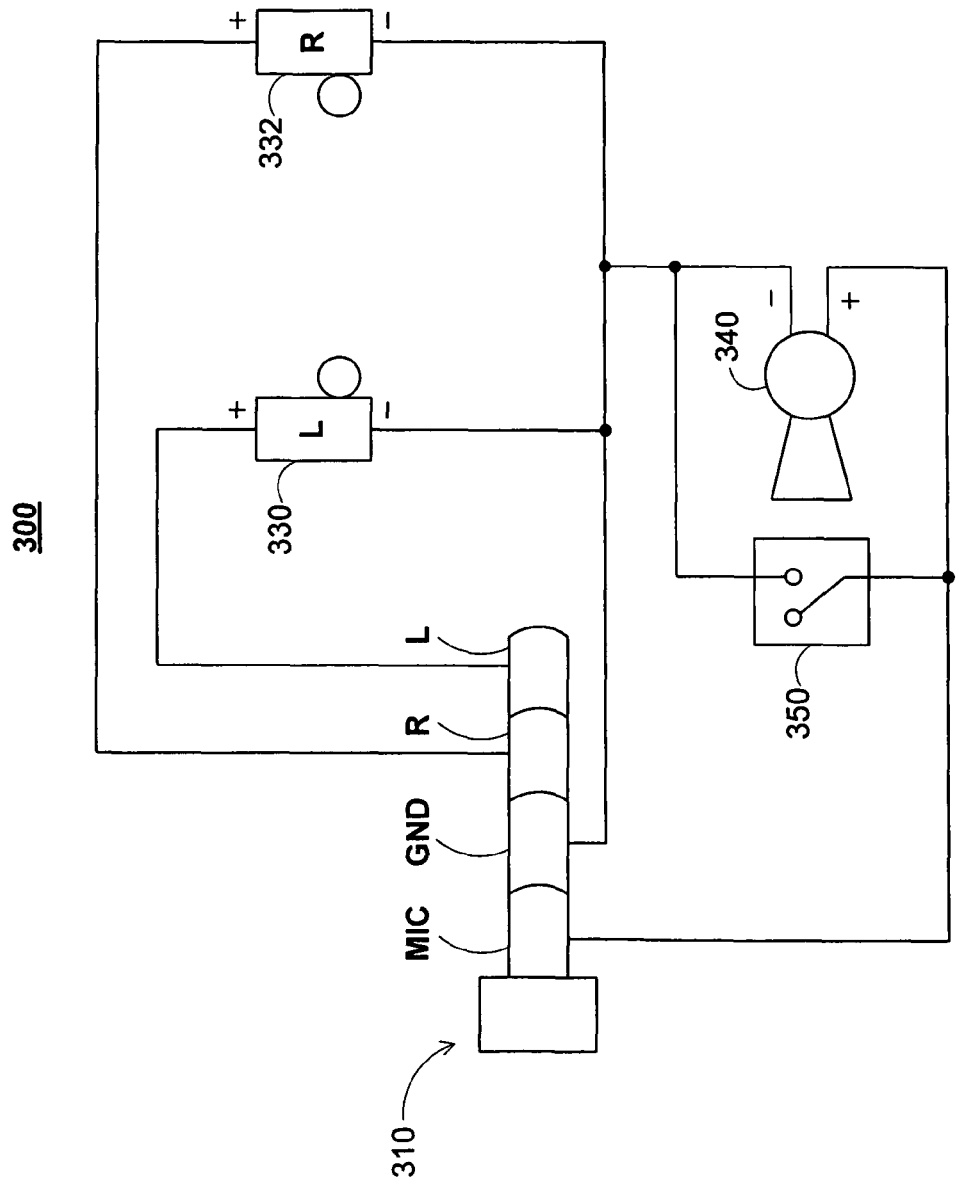
FIG. 3 is a simplified schematic diagram of headset system including stereo headphones, a microphone, and a four region plug in accordance with an embodiment of the present invention.

FIG. 3 is an illustrative simplified schematic diagram of headset system 300 including stereo headphones, a microphone, and a four region plug. FIG. 3 shows how the regions of plug 310 electrically connect to the left and right acoustic elements 330 and 332 (e.g., speakers), and microphone 340. As shown, the left audio signal region, the right audio signal region, and microphone region can be connected to the positive terminals of left acoustic element 330, right acoustic element 332, and microphone 340, respectively. The ground region can be connected to the negative terminals of left acoustic element 330, right acoustic element 332, and microphone 340, respectively.

Headset system 300 may include a switch 350, for example, to enable a user to activate a function with respect to the microphone. Switch 350 may be connected to the microphone and ground regions of plug 310. Switch 350 may be a normally OPEN switch, meaning that in its normal state, microphone 340 is permitted to transmit signals to the microphone portion of plug 310. When switch 350 is CLOSED, microphone 340 is shorted.

Figure 4:
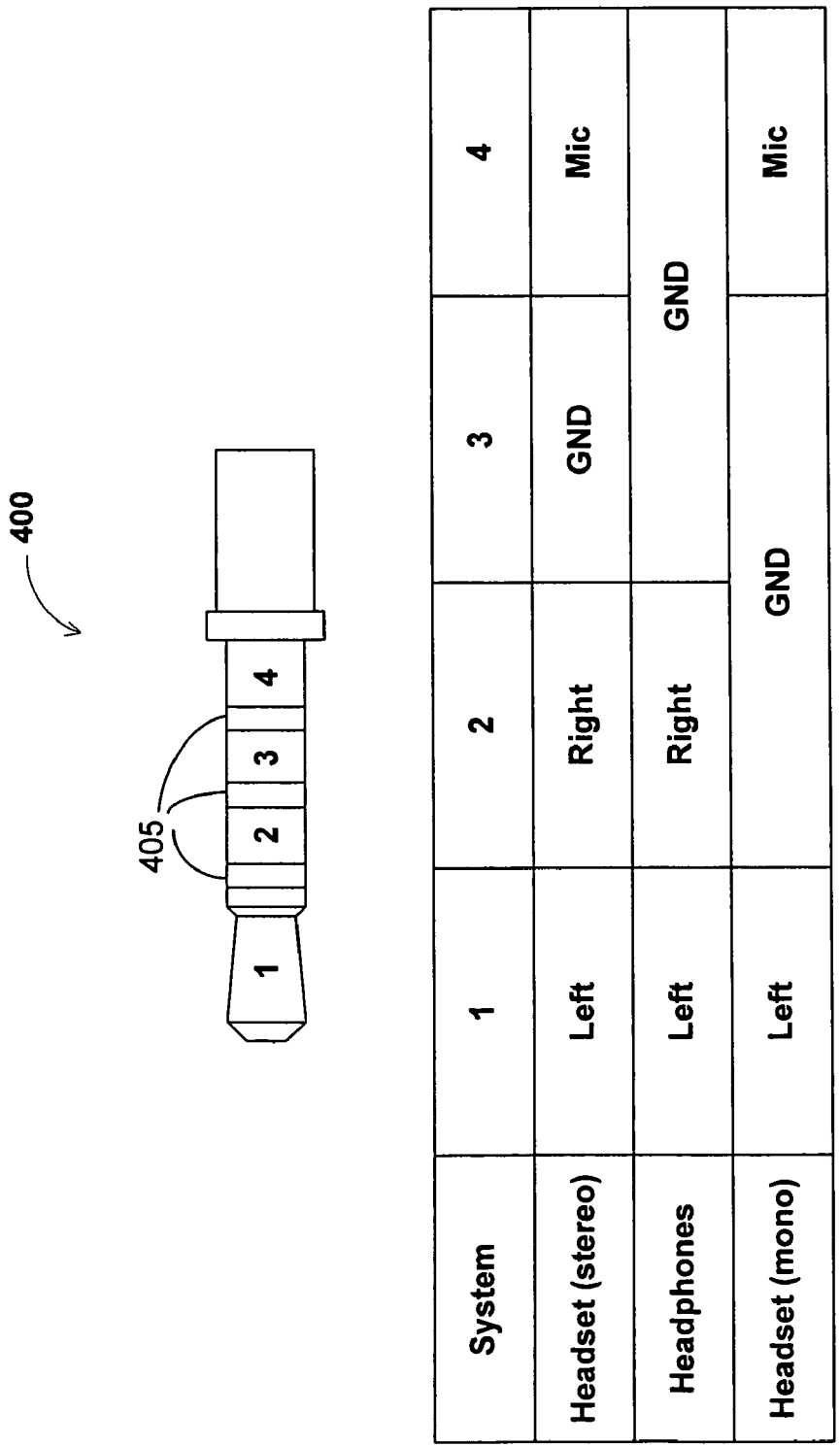
FIG. 4 shows a more detailed yet simplified view of a four region plug in accordance with an embodiment of the present invention.

FIG. 4 shows a more detailed yet illustrative simplified view of a four region plug 400. Plug 400 includes four regions, delineated by the numbers 1-4, separated by insulating rings 405. Plug 400 may be a 3.5 mm plug, where the outer diameter of regions 2-4 is 3.5 mm. Depending on which headset or headphone system plug 400 is connected to, the regions may be used for different signal conducting purposes. The table accompanying FIG. 4 shows the signal conducting purpose of each region for several different systems. For example, for a monaural headset, region 1 may be used for a speaker, regions 2 and 3 may be used as ground, and region 4 may be used for a microphone. Note that for the headset, regions 3 and 4 may be combined to form a single region (not separated by an insulating ring), thereby providing a three-region plug. Further note that for the monaural headset, regions 2 and 3 may be combined to form a single region, providing a three-region plug with a ground region between a microphone region and an audio signal region. Alternatively, in the monaural headset, region 2 may exist but may not connect to, for example, a speaker in the headset and region three may be dedicated to ground.

Figure 5:
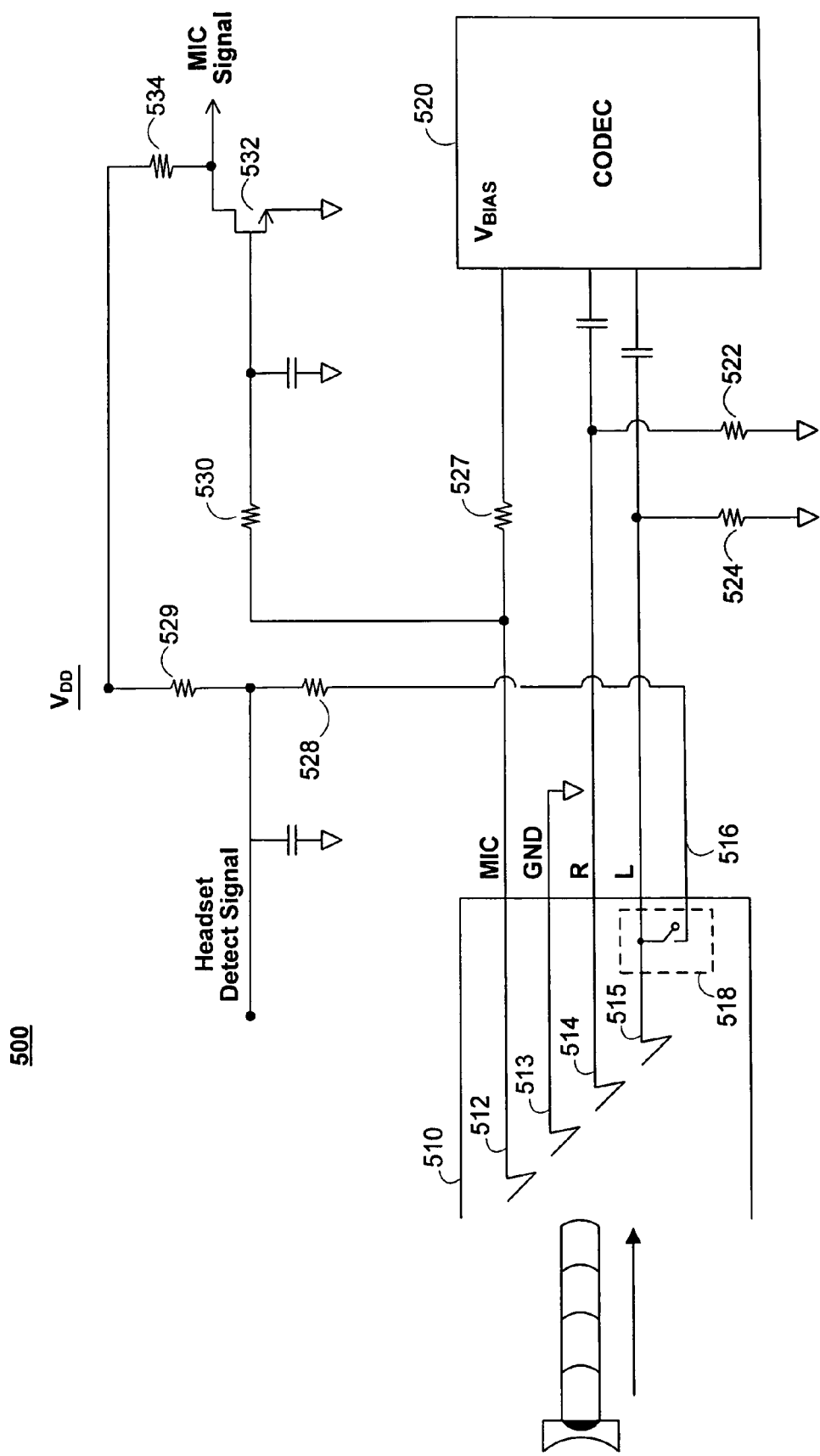
FIG. 5 shows a schematic diagram of detection circuitry in accordance with an embodiment of the present invention.

FIG. 5 shows an illustrative schematic diagram of detection circuitry 500. Detection circuitry 500 may be operative to determine whether a microphone type of plug (e.g., a four region plug including a microphone region and two audio regions, or a three region plug including microphone region and only one audio region) or a non-microphone type of plug (e.g., stereo plug) is inserted into the jack of the electronic device (e.g., mobile phone). The detection circuitry may provide a MIC signal that indicates whether the received plug is a microphone or non-microphone type. For example, when the plug is received, a LOW MIC signal may indicate that a microphone type of plug is received. Detection circuitry 500 may also provide a HEADSET DETECT signal that indicates whether a plug is received by the jack. The MIC and HEADSET DETECT signals may be provided to other circuitry, such as a processor, with the electronic device for further processing by that other circuitry.

Circuitry 500 includes jack 510 for receiving a plug (e.g., a four region plug). Jack 510 includes MIC connector 512, GND connector 513, right connector 514, left connector 515, and headset detect connector 516. Connectors 512-515 are staggered such that each connector contacts a different region of a plug inserted into jack 510. For example, assuming plug 230 of FIG. 2 is inserted into jack 510, microphone region 234 contacts MIC connector 512, ground region 233 contacts GND connector 513, right region 232 contacts right connector 514, and left region 231 contacts left connector 515.

Connectors 512-515 may be arranged in a particular order to ensure desired jack connector to plug regions contacts are made and to ensure that detection circuitry 500 is able to correctly determine which type of headset (e.g., headset with or without microphone) is connected to jack 510. The arrangement of connectors 512-515 can match that of a four region plug according to the invention. That is, GND connector 513 may be located between MIC connector 512 and right connector 514. In another embodiment, GND connector 513 maybe located between MIC connector 512 and left connector 515.

MIC connector 512 may be electrically coupled to CODEC circuitry 520 via bias resistor 527 and transistor 532 (e.g., a FET) via resistor 530. GND connector 512 may be connected to a ground source. Right and left connectors 514 and 515 may be electrically connected to CODEC circuitry 520. In addition, right and left connectors 514 and 515 may be electrically connected to ground via resistors 522 and 524, respectively. Headset connector 516 may be electrically connected to a power source, called Vdd, via resistors 528 and 529. Vdd may also be connected to a terminal of transistor 532 via resistor 534.

Left connector 515 and headset detect connector 516 may be selectively connected together by a normally closed switch 518. Switch 518 may be CLOSED when no plug is inserted into jack 510. When CLOSED, Vcc is pulled to ground through resistor 522. Thus, when switch 518 is CLOSED, the HEADSET DETECT signal, which may be provided to a processor (e.g., processor 102 of FIG. 1), is LOW. A LOW HEADSET DETECT signal may indicate that no plug is inserted in jack 510. A HIGH HEADSET DETECT signal may indicate that a plug is inserted in jack 510. The HEADSET DETECT signal may go HIGH when a plug is inserted into jack 510, the plug causes switch 518 to OPEN. When switch 518 is OPEN, headset detect connector 516 can be pulled up to Vdd.

Detection circuitry 500 may provide a MIC signal, for example, to a processor (e.g., processor 102 of FIG. 1). The state of the MIC signal may indicate whether a headset with a microphone is connected to jack 510. In addition, if a microphone headset is connected to jack 510, changes in the state of the MIC signal may indicate the occurrence of a switch activation (e.g., a user presses a switch to end a telephone call).

MIC signal may be HIGH when transistor 532 is OFF and LOW when transistor 532 is ON. Transistor 532 may be an NMOS transistor. CODEC 520 may bias the gate of transistor 532 so that it is turned ON when a plug is absent from jack 510 and when a plug including a microphone region is inserted into jack 510.

Figure 6:
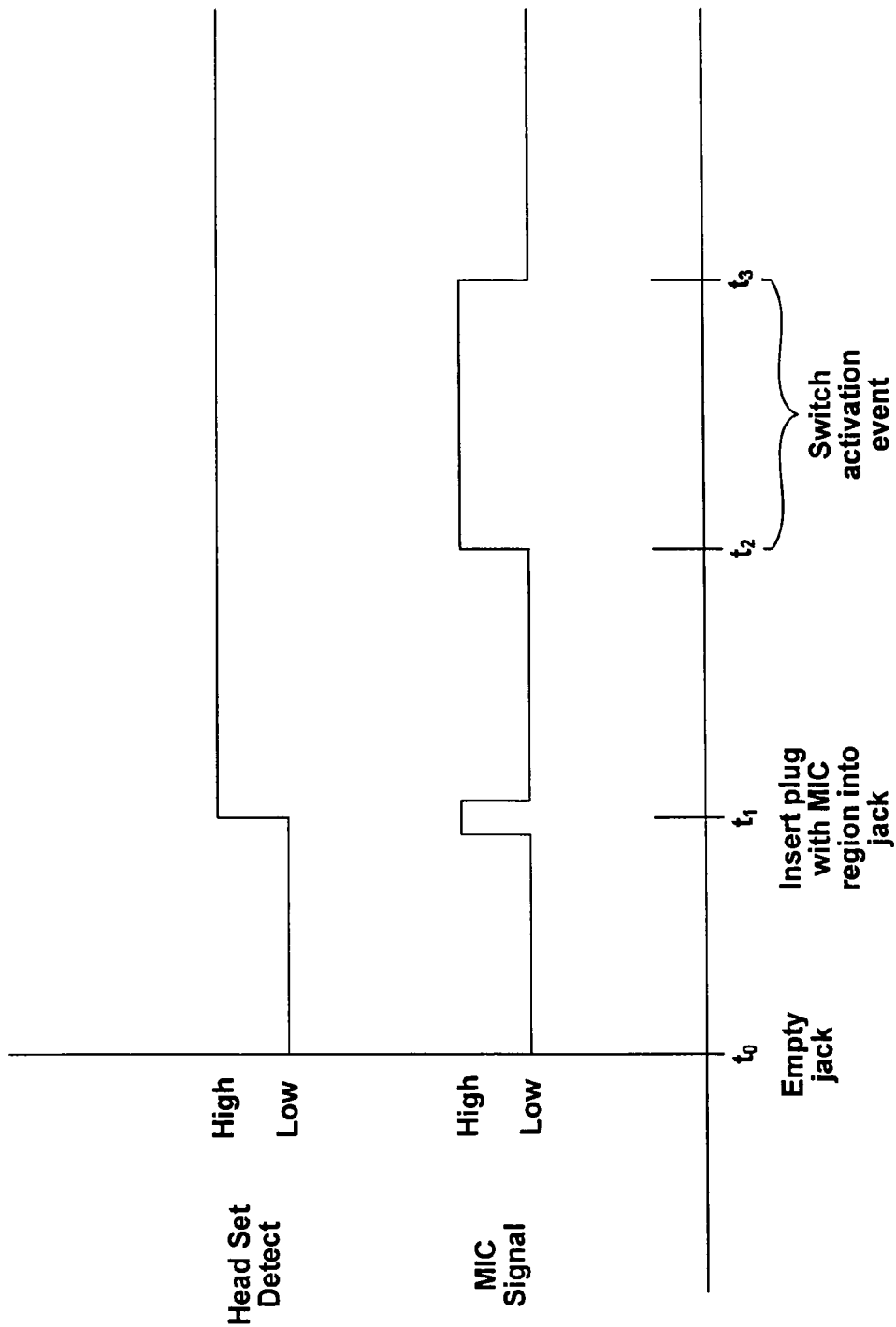
FIG. 6 is an exemplary timing diagram showing the state of the signals provided by detection circuitry in accordance with an embodiment of the present invention.

The operation of detection circuitry 500 is now discussed in combination with FIG. 6, which is an exemplary timing diagram showing the state of the HEADSET DETECT and MIC signals in accordance with an embodiment of the present invention. Starting at time t0, when jack 510 is empty, the both the HEADSET DETECT and MIC signals are LOW. HEADSET DETECT may be LOW because switch 518 is CLOSED, effectively tying connector 516 to ground. MIC signal may be low because CODEC circuitry 520 is biasing transistor 532 to be turned ON, pulling MIC signal to ground.

At time t1, when a plug with a microphone region is inserted into jack 510, HEADSET DETECT signal goes HIGH and MIC signal may pulse HIGH due to shorting of wire contacts during plug insertion, but goes LOW. The processor may be configured to ignore any MIC signal until at least a predetermined period of time after HEADSET DETECT goes HIGH to avoid erroneous detection. HEADSET DETECT signal may go HIGH because switch 518 OPENS in response to jack 510 receiving a plug. MIC signal may continue to stay LOW because transistor 532 is still biased to be turned ON (by CODEC circuitry 520).

Between times t2 and t3, a switch activation event occurs. During this event, MIC signal goes HIGH because transistor 532 is turned OFF. Transistor 532 may be turned OFF when MIC connector 512 is shorted to ground through resistor 524. For example, MIC connector 512 may be shorted when a switch such as switch 350 of FIG. 3 is CLOSED. When shorted, the voltage, including a bias voltage provided by CODEC 520, on connector 512 drops below a threshold voltage on transistor 532, thereby causing transistor 532 to turn OFF. When transistor 532 is turned OFF, the MIC signal is pulled to Vdd via resistor 534. After time t3, the switch activation event ends, at which point transistor 532 turns back ON, pulling the MIC signal down to ground.

Figure 7:
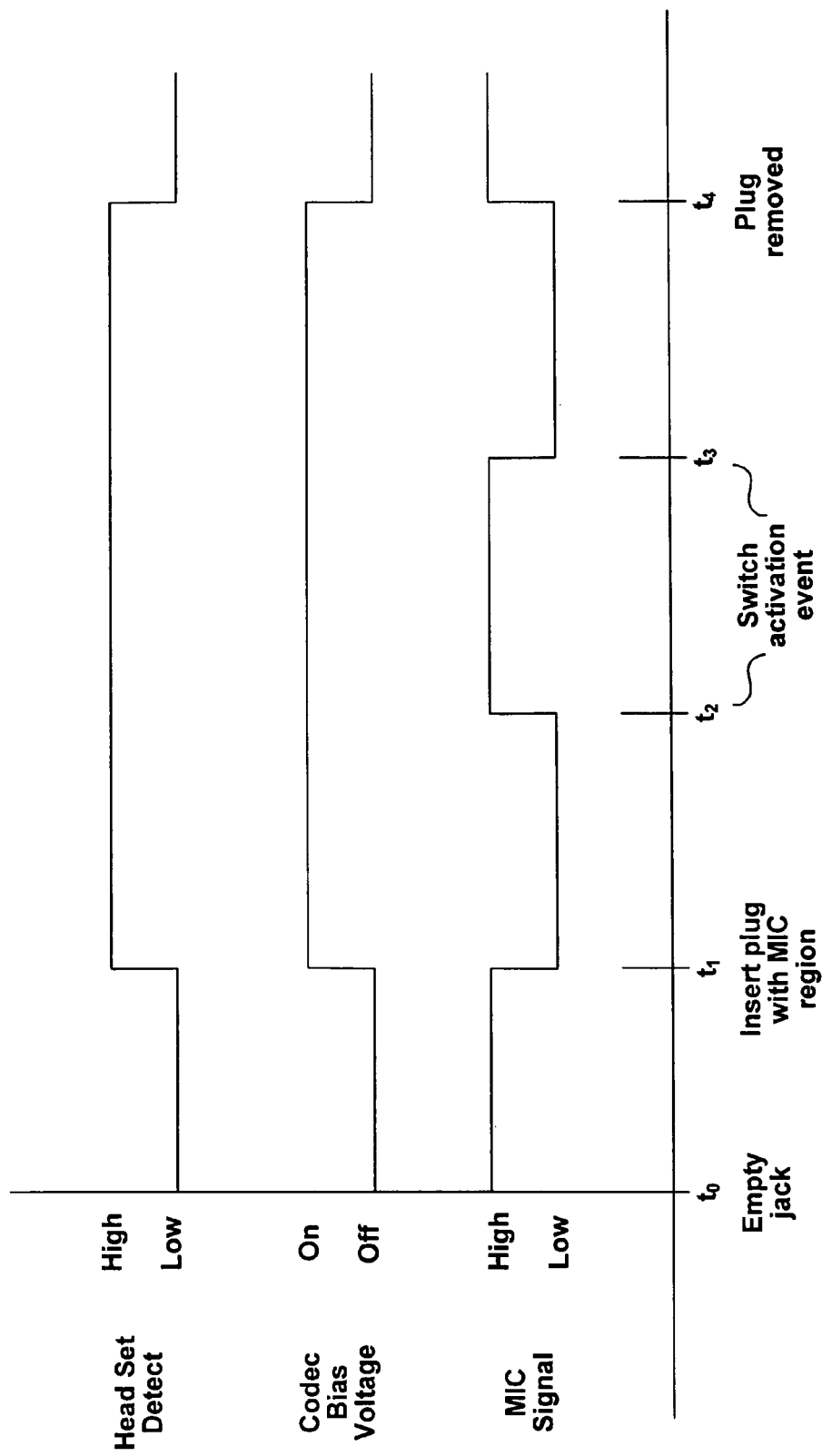
FIG. 7 shows another exemplary timing diagram illustrating operation of detection circuitry using power management in accordance with an embodiment of the present invention.

FIG. 7 shows another exemplary timing diagram illustrating operation of headset detection circuitry 500 using power management in accordance with the principles of the present invention. Using power management, CODEC circuitry 520 may provide a bias voltage only when a plug is inserted into jack 510. Starting at time t0 (an empty jack 510), HEADSET DETECT signal is LOW, which may prevent CODEC circuitry 520 from supplying a bias voltage, thus providing power savings. MIC signal is HIGH because no bias voltage is provided to turn transistor 532 ON. At time t1, when a plug with a microphone region is inserted into jack 510, HEADSET DETECT goes HIGH, which may cause CODEC circuitry 520 to provide a bias voltage that turns transistor 532 ON, pulling MIC signal LOW. Between times t2 and t3, a switch activation event occurs, during which MIC signal is HIGH. At time t4, the plug is removed, causing HEADSET DETECT signal to go LOW. This causes CODEC circuitry 520 to cease supplying a bias voltage and MIC signal goes HIGH.

With respect to FIGS. 6 and 7, a processor may determine whether the type of plug inserted into jack 510 is a plug having a microphone region by checking the state of the MIC signal a predetermined time after the HEADSET DETECT signal goes HIGH. In both FIGS. 6 and 7, the MIC signal is LOW a predetermined time (e.g., 10 ms) after HEADSET DETECT goes HIGH, thus indicating that a microphone is present.

Figure 8:
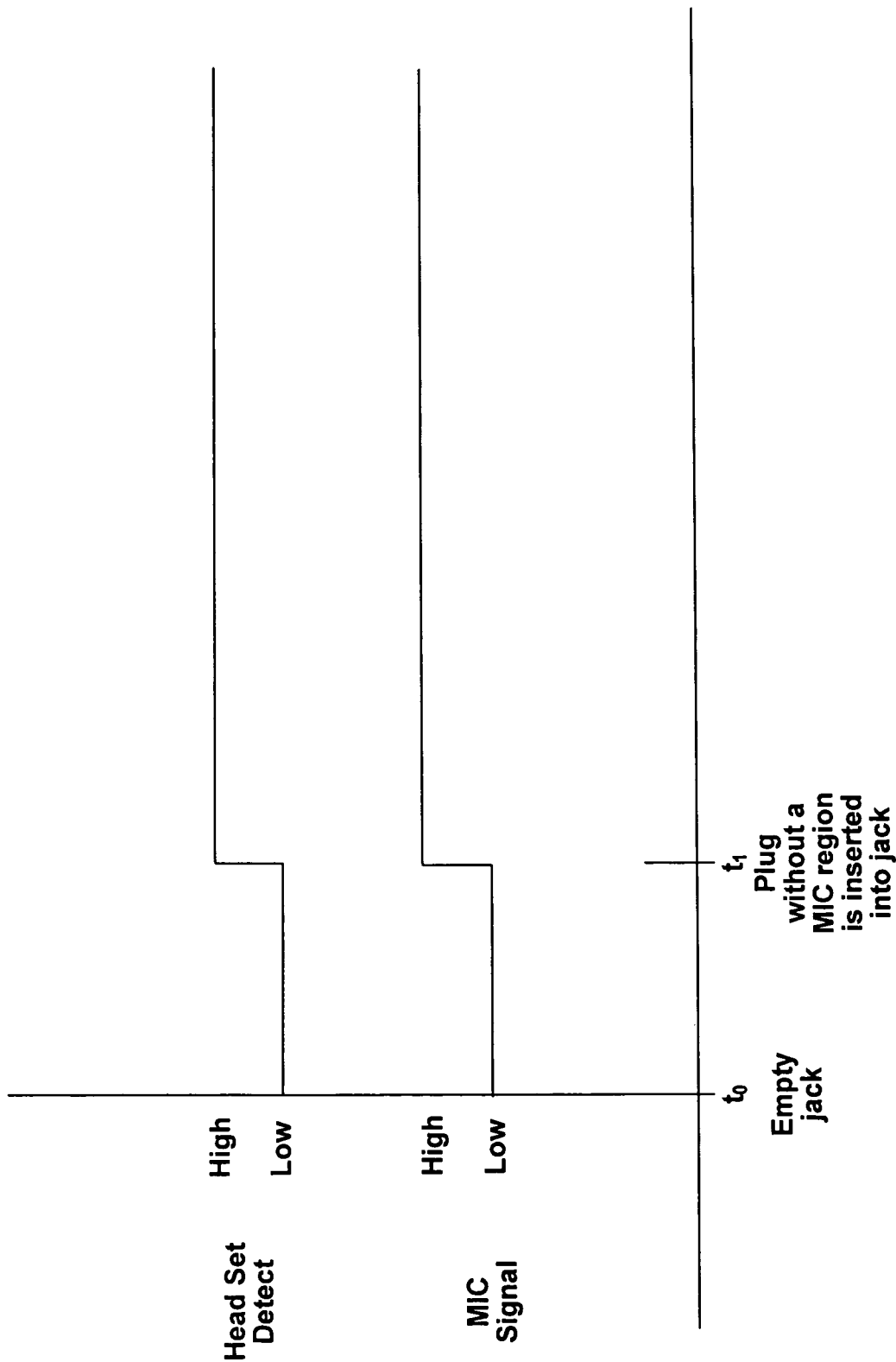
FIG. 8 illustrates an exemplary timing diagram when a plug that does not have a microphone region is inserted into jack 510 in accordance with an embodiment of the present invention.

FIG. 8 illustrates an exemplary timing diagram when a plug that does not have a microphone region is inserted into jack 510. Starting at step t0, when no plug is inserted into jack 510, both HEADSET DETECT and MIC are LOW. At time t1, when a plug with a MIC region is inserted into jack 510, both HEADSET DETECT and MIC go HIGH. MIC may go HIGH because the MIC connector 512 is tied to ground, effectively pulling the gate of transistor 532 to ground, turning it OFF. MIC connector 512 may be coupled to ground connector 513 by a ground region of the plug. For example, assuming that plug 250 of FIG. 2 is inserted into jack 510, ground region 255 may electrically couple MIC connector 512 to ground connector 513.

Figure 9:
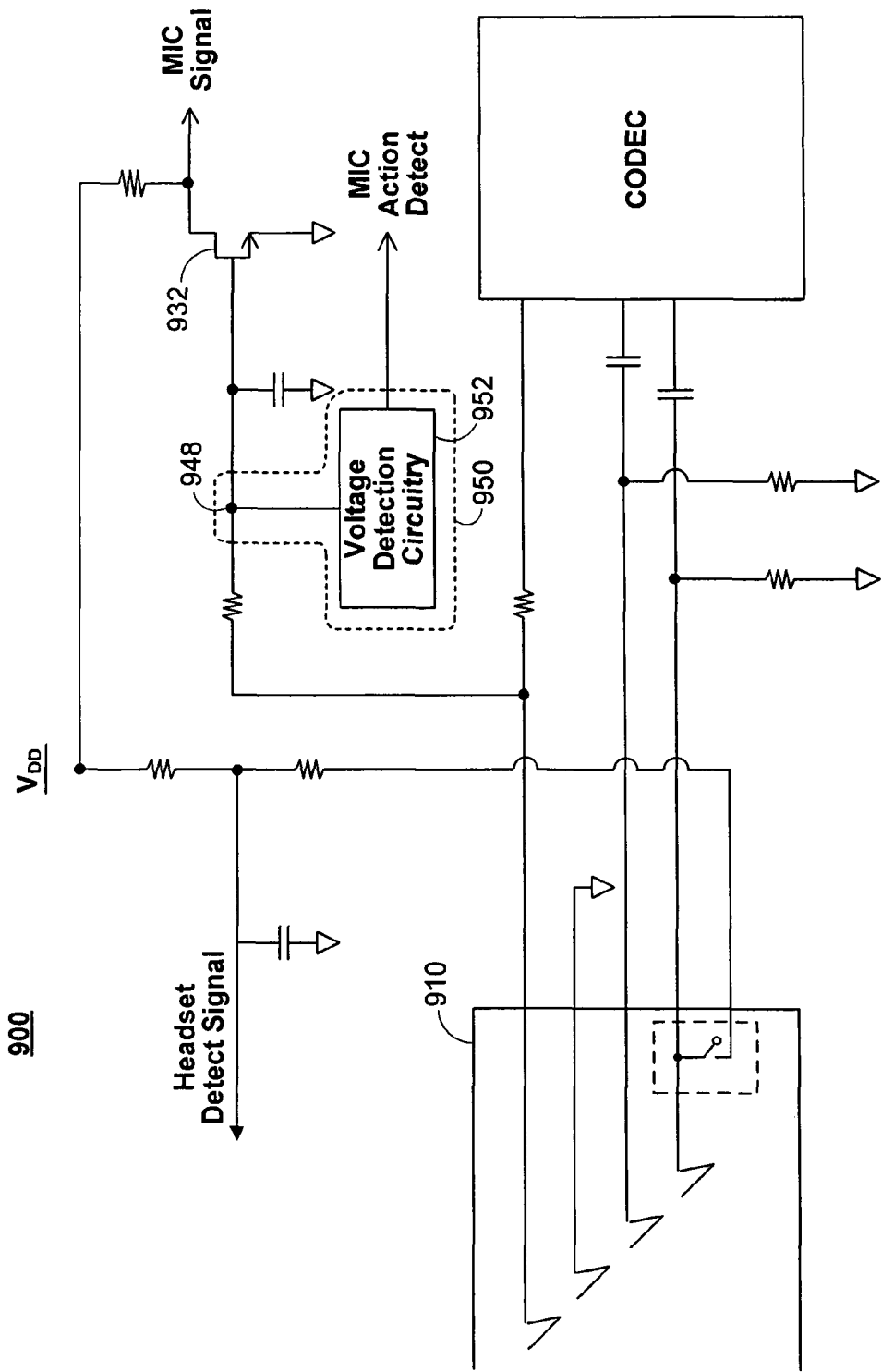
FIG. 9 shows a schematic diagram of detection circuitry including secondary switch detection circuitry according to an embodiment of the present invention.
Figure 13:
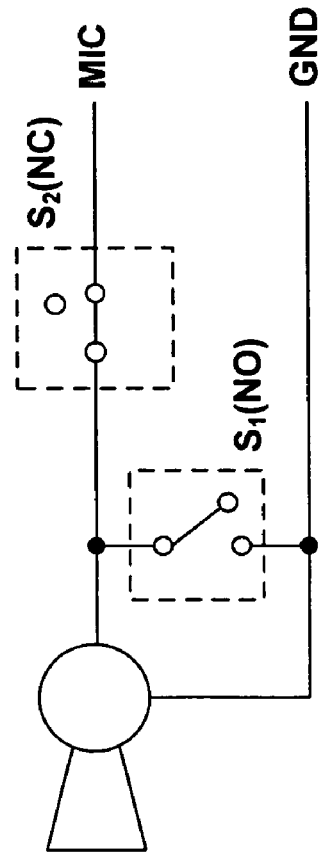
FIGS. 13 and 14 show two illustrative examples of dual switch configurations that may be implemented with respect to a microphone in accordance with a embodiments of the present invention.
Figure 14:
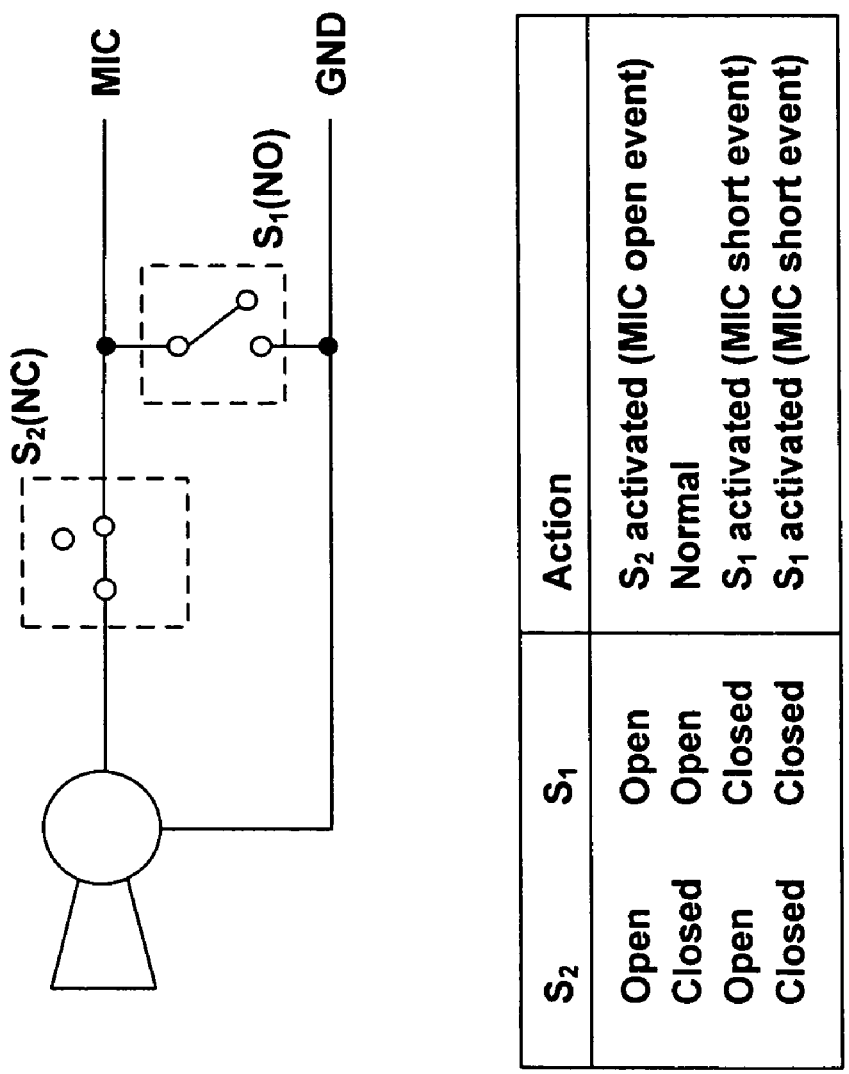

FIG. 9 shows a schematic diagram of detection circuitry 900 including secondary switch detection circuitry 950. Detection circuitry 900 may be the same as detection circuitry 500, therefore a detailed discussion of all the components and operation of circuitry 900 is not needed. Secondary switch detection circuitry 950 may be included for detecting switch activation events of headsets including multiple switches. For example, a headset may include two switches, where activation of each switch may perform a different function, and where simultaneous activation of both switches may perform yet another function. FIGS. 13 and 14 show two illustrative examples of dual switch configurations that may be implemented with respect to a microphone. FIGS. 13 and 14 show a normally closed switch connected in series with the MIC region of a plug (not shown) and a normally open switch connected in parallel with the MIC region of the plug. The tables accompanying FIGS. 13 and 14 show which switch is activated, if any, depending on the open and close positions of switches S1 and S2. The table also indicates whether an MIC OPEN event (e.g., an event in which the MIC is electrically disconnected from the jack) or MIC SHORT event (e.g., an event in which the MIC is short circuited to ground. A normal action may occur when switches S1 and S2 are in their normal positions.

Referring back to FIG. 9, secondary switch detection circuitry 950 may monitor a voltage level to determine the occurrence of switch activation events. Detection circuitry 950 may include voltage detection circuitry 952 electrically coupled to node 948. Voltage detection circuitry 952 provide a HIGH or LOW signal, labeled MIC ACTION DETECT, depending on the voltage seen at node 948. In one embodiment, the voltage detection circuitry may include a comparator that compares to the voltage at node 948 to a reference voltage. The voltage at node 948 may vary among several different voltage levels. For example, node 948 may see a no plug present voltage, a first switch activation voltage, a second switch activation voltage, a combined first and second switch activation voltage, and a normal operating voltage. Depending on the voltage seen at node 948, detection circuitry 900 provides the appropriate signals for MIC and MIC ACTION DETECT.

Figure 10:
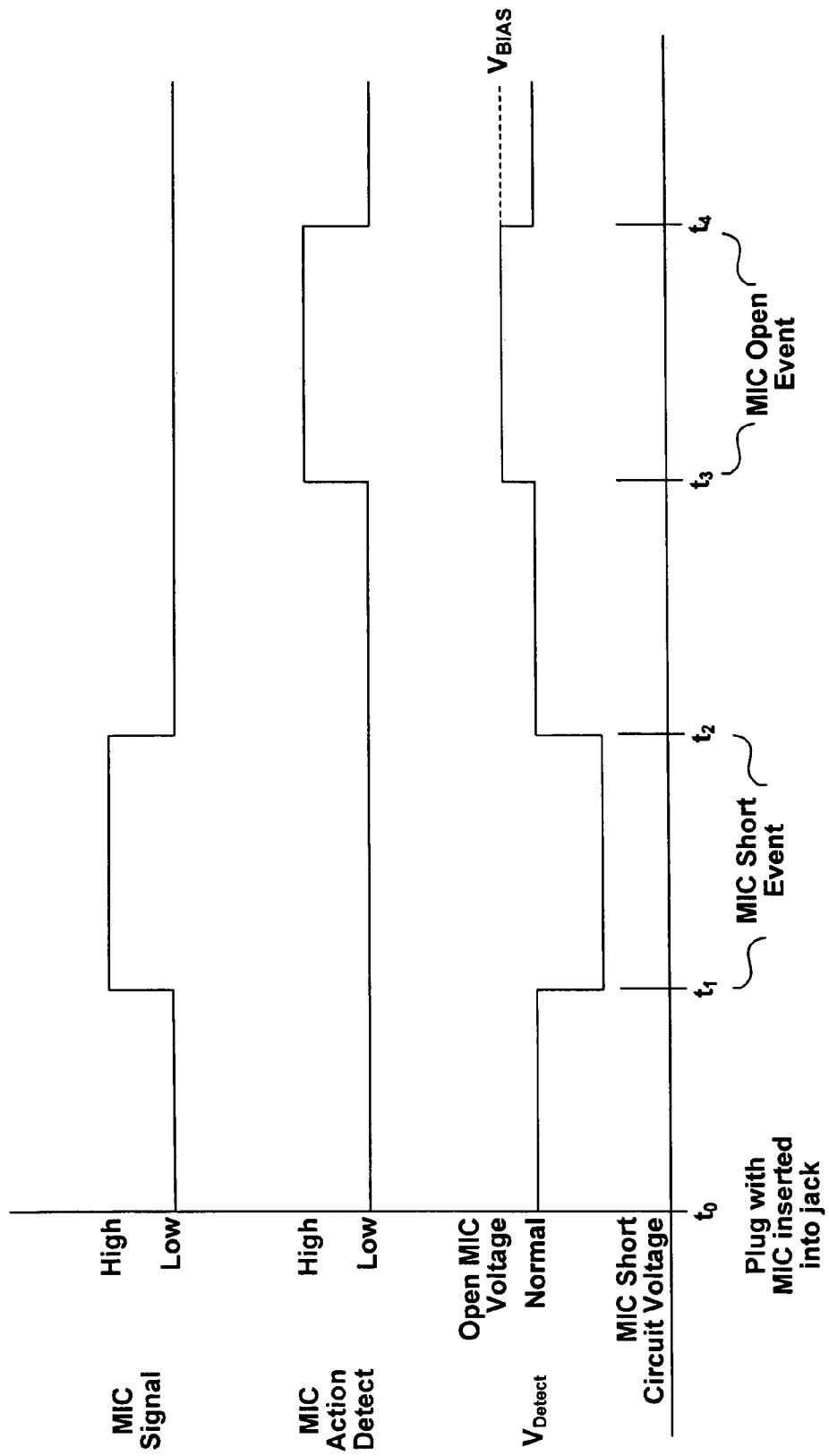
FIG. 10 shows an exemplary timing diagram.

FIG. 10 shows an exemplary timing diagram illustrating assertion of signals based on detected voltage levels using detection circuitry 900 operating in connection with a dual switch, such as those shown in FIGS. 13 and 14. FIG. 10 shows the state of the MIC and MIC ACTION DETECT signals and the voltage detected at node 948, labeled VDETECT. The detected voltage may range from an OPEN MIC voltage to a normal voltage to a MIC short circuit voltage. A normal voltage may be detected when a plug with a microphone is inserted into jack 910 and the microphone is operating in a normal mode (e.g., no switches are being activated), as indicated at time t0. The normal voltage may be the voltage produced when the CODEC circuitry biases the microphone and the transistor 932. Between times t1 and t2, a MIC short circuit event occurs. During the MIC short circuit event, MIC signal goes HIGH and VDETECT goes to the MIC short circuit voltage (or ground). Also, during the MIC short circuit event, the bias voltage is driven to ground, resulting in a negligible voltage at node 948. Between times t2 and t3, detection circuitry 900 returns to normal operation. Between times t3 and t4, a MIC OPEN event occurs. During the MIC OPEN event, VDETECT may go to OPEN CIRCUIT voltage, which results in MIC ACTION DETECT going HIGH. The voltage at node 948 may be higher during a MIC OPEN event than normal operation because the microphone is no longer biased by the CODEC circuitry.

Figure 11:
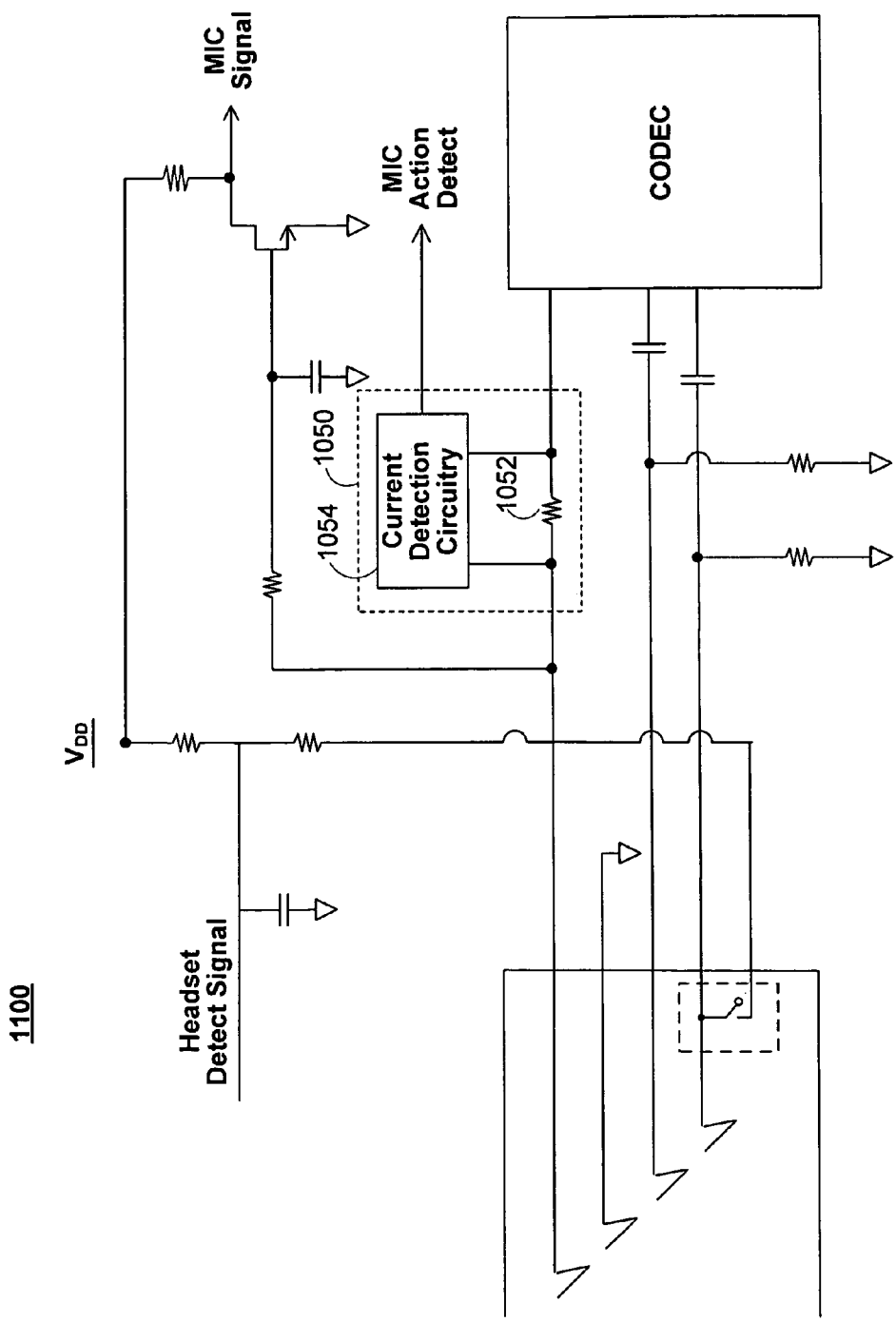
FIG. 11 shows a schematic diagram of detection circuitry including alternative secondary switch detection circuitry according to an embodiment of the present invention.

FIG. 11 shows a schematic diagram of detection circuitry 1000 including alternative secondary switch detection circuitry 1050. Detection circuitry 1000 may be the same as detection circuitry 500, therefore a detailed discussion of all the components and operation of circuitry 1000 is not needed. Secondary switch detection circuitry 1050 may include current detection circuitry 1054 for detecting a current level flowing through resistor 1052. Depending on the detected current level, circuitry 1050 may provide the appropriate signal (e.g., HIGH or LOW signal) to MIC ACTION DETECT.

In one embodiment, three different current levels may exist. A first current level may correspond to a microphone short condition (e.g. current flow may be high). A second current level may correspond to a normal microphone bias condition (e.g., current flow may be such that the microphone is biased). And a third current level may correspond to a microphone open condition (e.g., current flow may be low and the microphone is no longer biased). Current detection circuitry 1050 may assert MIC ACTION DETECT when the third current level is detected. The MIC signal may be asserted when a microphone short condition exist.

Figure 12:
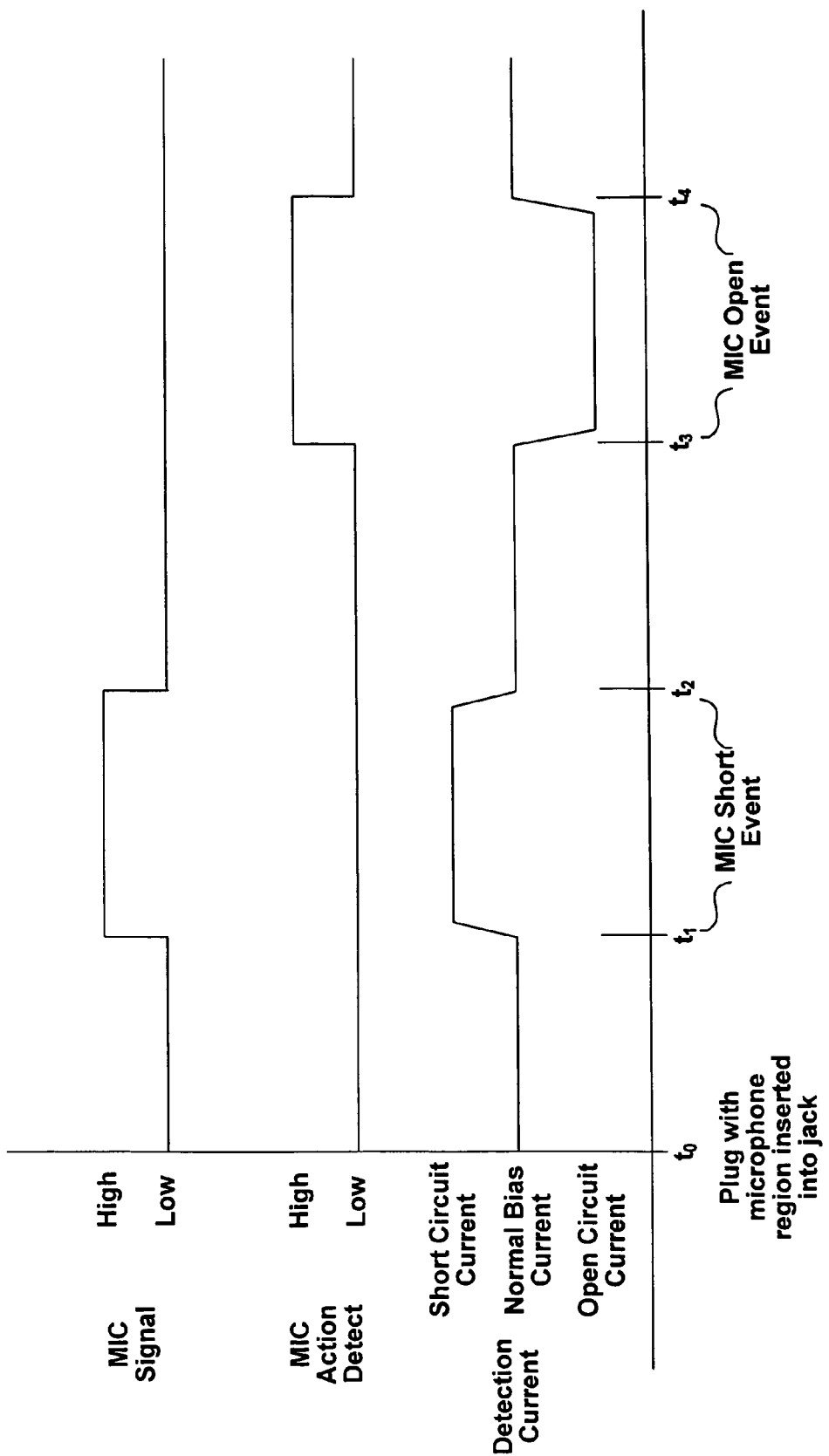
FIG. 12 shows an exemplary timing diagram illustrating assertion of signals based on detected current levels using detection circuitry operating in accordance with an embodiment of the present invention.

FIG. 12 shows an exemplary timing diagram illustrating assertion of signals based on detected current levels using detection circuitry 1100 operating in connection with a dual switch, such as those shown in FIGS. 13 and 14. FIG. 12 shows the state of the MIC and MIC ACTION DETECT signals and the current voltage detected at node 948, labeled DETECTION CURRENT. DETECTION CURRENT may range from a short circuit current to a normal bias current to an open circuit current. The normal bias current may be detected when a microphone electrically connected detection circuitry 1100 is operating in a normal mode, as indicated between times t0 and t1. Between times t1 and t2, a MIC short event occurs, which may result in MIC signal going HIGH and DETECTION CURRENT going increasing to short circuit current. Between times t3 and t4, a MIC OPEN event occurs, which may result in MIC ACTION DETECT going HIGH and DETECTION CURRENT decreasing to a open circuit current.

It is understood that although FIGS. 9-14 are discussed in terms of handling switch activation event executed by two different switches, circuitry may be provided to detect simultaneous activation of two switches and additional switches.

Figure 15:
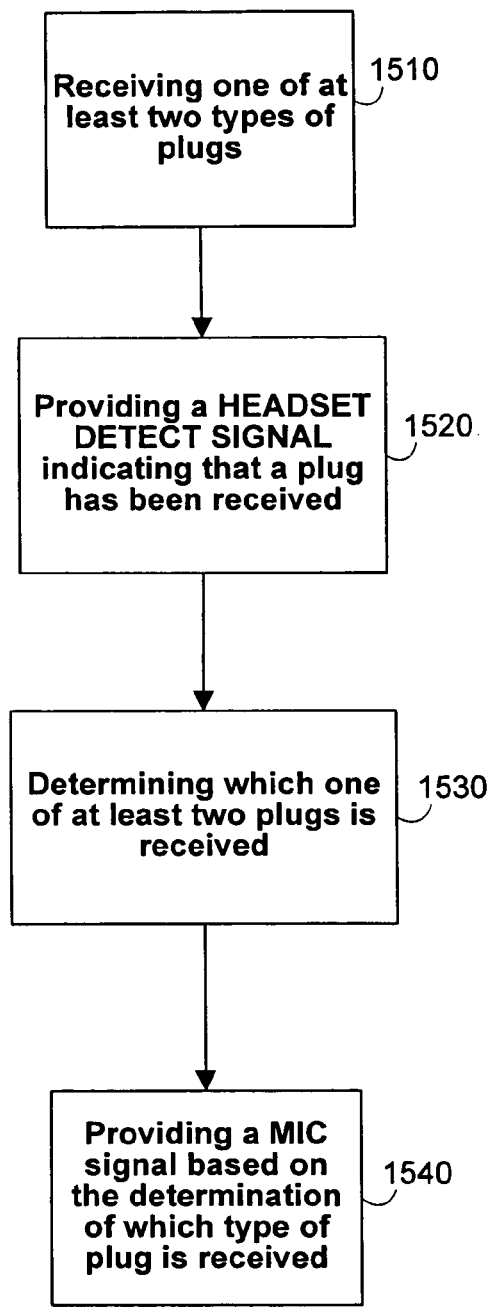
FIG. 15 is a flowchart illustrating steps that may be implemented by detection circuitry in accordance with an embodiment of the present invention.

FIG. 15 is an illustrative flowchart of various steps that may be implemented by detection circuitry. Starting at step 1510, one of at least two types of plugs is received, for example, in a jack of the detection circuitry. For example, the plug may be a four region plug including a microphone region (with a ground region located between the mic region and an audio signal region), a three region plug including a microphone region (with a ground region located between the mic region and an audio signal region), or a three region plug with no microphone region. At step 1520, a HEADSET DETECT signal may be provided (e.g., asserted) to indicate that a plug has been received. After the HEADSET DETECT signal is asserted, the bias power may be provided to bias, for example, the MIC DETECT transistor (e.g., transistor 532), if it is not already being biased.

Figure 16:
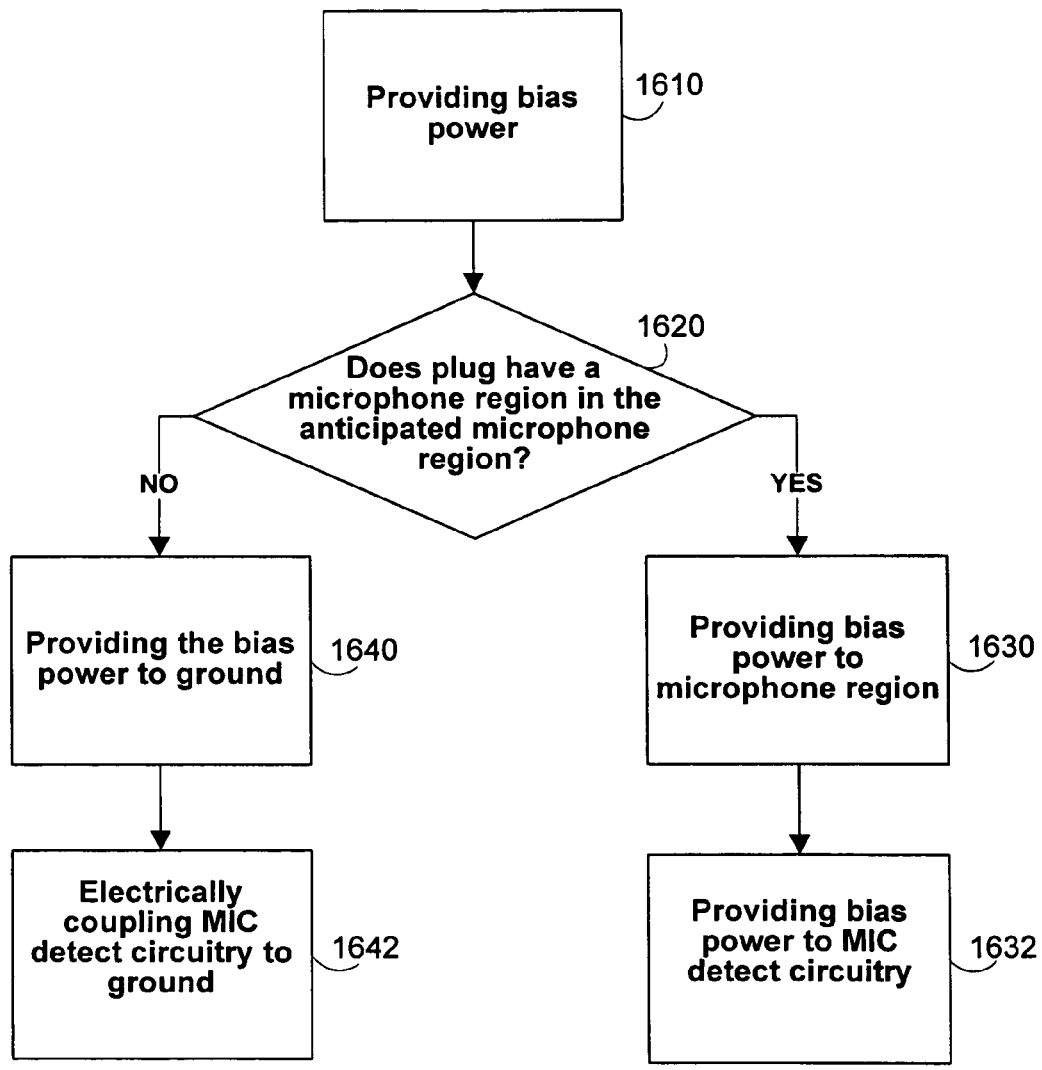
FIG. 16 is flowchart showing in more detail how one of the steps of FIG. 15 may be implemented in accordance with an embodiment of the present invention.

At step 1530, a determination is made as to which one of the at least two types of plugs is received. This determination may be made a predetermined period of time after the HEADSET DETECT signal has been asserted to provide sufficient "settling time" before making the determination. The determination may be made in one of several different ways, one of which is illustrated in the steps shown in FIG. 16. Referring to FIG. 16, at step 1610, bias power is provided. For example, bias power may be provided by CODEC circuitry. At step 1620, a determination is made as to whether the plug has a microphone region in the anticipated microphone region. If yes, the process proceeds to step 1630, which provides the bias power to the microphone region. At step 1632 the bias power is provided to MIC detect circuitry. If no, the process proceeds to step 1640, which provides the bias power to ground. At step 1642, MIC detect circuitry is electrically coupled to ground.

Referring back to FIG. 15, after the determination is made at step 1530, the appropriate MIC signal is provided at step 1540. For example, if a microphone region is detected, the MIC signal may be LOW, and HIGH if not detected. If a microphone region is not detected, then the MIC DETECT transistor (e.g., transistor 532) may be turned OFF to save power. MIC DETECT transistor may be turned by ceasing the supply of the bias power.

Figure 17:
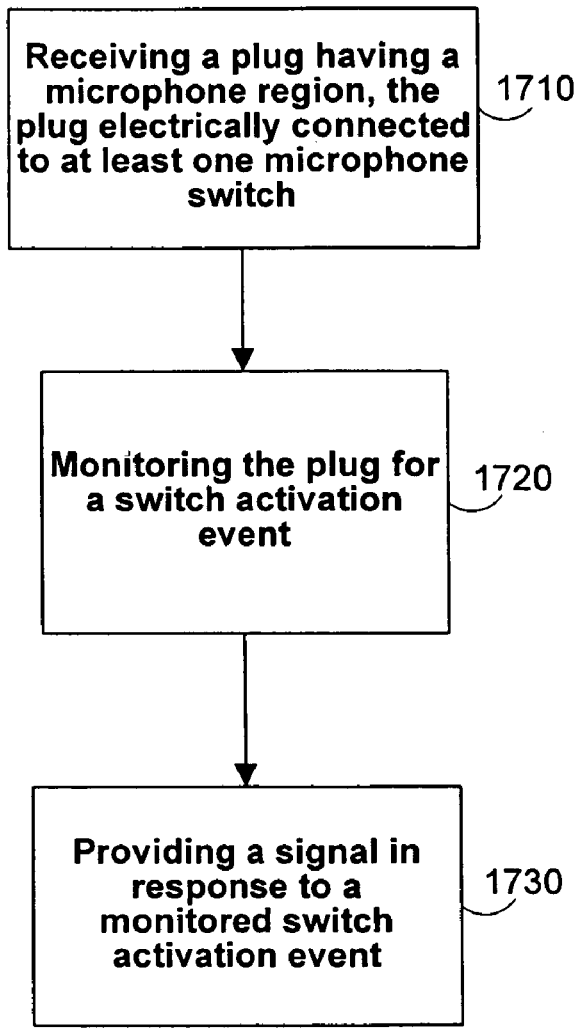
FIG. 17 is a flowchart of steps that may be taken when one or more switch activation events are detected in accordance with an embodiment of the present invention.

FIG. 17 is an illustrative flowchart of various steps that may be taken when one or more switch activation events are detected in accordance with the principles of the present invention. Starting at step 1710, a plug having a microphone region and is electrically connected to at least one microphone switch is received. For example, the plug may be electronically connected to a single or dual switch headset. At step 1720, the plug may be monitored for a switch activation event. If the headset has two switches, switch activation event caused by both switches may be monitored. For example, one switch may cause an OPEN MIC switch activation event and the other switch may cause a MIC short circuit activation event when activated (e.g. pressed by the user). At step 1730, a signal is provided in response to a monitored switch activation event. For example, if a single switch headset is connected to the detection circuitry and is activated, the MIC signal may be asserted (for at least the duration of the switch activation event).

It is understood that the steps shown in FIGS. 15-17 are merely illustrative and that steps may be modified, added, or omitted.

Thus it is seen that plug with microphone regions and systems and methods detecting such plugs and switch activation events are provided. Those skilled in the art will appreciate that the invention can be practiced by other than the described embodiments, which are presented for purposes of illustration rather than of limitation, and the invention is limited only by the claims which follow.

What is claimed is:

1. A system for detecting which type of plug is received by a portable electronic device, the system comprising:
a jack constructed to receive a plug selected from at least a microphone type and a non-microphone type, wherein the jack comprises a microphone connector electrically coupled to CODEC circuitry and microphone detection circuitry, a ground connector coupled to a ground source, a right connector coupled to the CODEC circuitry, and a left connector coupled to the CODEC circuitry, and wherein the ground connector is positioned between the microphone connector and either the left connector or the right connector;
the microphone detection circuitry operative to:

determine whether the received plug is the microphone type or the non-microphone type; and provide a signal indicative of whether the received plug is the microphone type or the non-microphone type.

2. The system of claim 1, wherein the device is a mobile telephone.

3. The system of claim 1, wherein the detection circuitry is operative to monitor the microphone connector for a switch activation event.

4. The system of claim 3, wherein the detection circuitry is operative to change the state of the signal in response to a monitored switch action event.

5. The system of claim 4, further comprising:
voltage detection circuitry electrically coupled to a node existing between the resistor and transistor, the voltage detection circuitry operative to provide a switch action detect signal.

6. The system of claim 4, further comprising:
current detection circuitry electrically coupled to a resistor electrically coupled between the node and the bias power source, the current detection circuitry operative to provide a switch action detect signal.

7. The system of claim 1, wherein the jack comprises a microphone connector electrically coupled to microphone detection circuitry, and further comprising:
a bias power source, wherein the microphone connector is electrically coupled to the bias power source;
a resistor electrically coupled to a node existing between the bias power source and the microphone connector; and
a transistor electrically coupled to the resistor, the transistor operative to provide a signal.

8. The system of claim 1, further comprising:
a processor electrically coupled to receive at least the signal and a HEADSET DETECT signal.

9. A system for detecting which type of plug is received by a portable electronic device, the system comprising:
a jack constructed to receive a plug selected from at least a microphone type and a non-microphone type; and
detection circuitry electrically coupled to the jack operative to:
determine whether the received plug is the microphone type or the non-microphone type; and
provide a signal indicative of whether the received plug is the microphone type or the non-microphone type, wherein the jack comprises a normally closed switch electrically coupled to a power source and at least one of the right and left connectors, the switch operative to be opened by the plug when the plug is received by the jack.

10. The system of claim 9, further comprising a node coupled between the switch and the power source, the node provides a HEADSET DETECT signal.

11. A method for using a portable electronic device to detect a plug type, the method comprising:
receiving a plug selected from at least a microphone type and a non-microphone type;
determining whether the received plug is the microphone type or the non-microphone type, wherein the determining comprises:
providing bias power;
if the received plug has a microphone region in an anticipated microphone region, providing the bias power to a transistor operative to provide the signal; and
if the received plug does not have a microphone region in the anticipated microphone region, electrically coupling the transistor to ground; and providing a signal based on the determination of whether the received plug is the microphone type or the non-microphone type.

12. The method of claim 11, wherein the received plug is a microphone type of plug electrically connected to microphone circuitry, the method further comprising:
biasing the microphone circuitry.

13. The method of claim 11, further comprising:
providing a HEADSET DETECT signal through a normally closed switch opened by the plug in response to receiving the plug.

14. The method of claim 11, wherein the device is a mobile telephone.

15. A method for using a portable electronic device comprising a received plug including a microphone region that is electrically connected to a switch, the method comprising:
monitoring the plug for a switch activation event executable by the switch; and
providing a signal in response to a monitored switch activation event executed by the switch
providing bias power to the microphone region;
providing the signal at a first state when the microphone is biased;
in response to the monitored switch event, electrically coupling the bias power to a ground source and providing the signal at a second state,
wherein the signal is a first switch signal, the switch is a first switch, and the microphone region is electrically coupled to a second switch, the method comprising:
changing the state of the first switch signal in response to a monitored first switch activation event; and
changing the state of a second switch signal in response to a monitored second switch activation event.

16. The method of claim 15, wherein the monitored switch activation event is a short circuit event.

17. The method of claim 15, wherein the switch activation event is an open circuit event.

18. The method of claim 15, wherein the device is mobile telephone.

19. A system for detecting which type of plug is received by a portable electronic device, the system comprising:
a jack constructed to receive a plug selected from at least a microphone type and a non-microphone type, wherein the jack comprises at least a microphone connector electrically coupled to microphone detection circuitry, and a ground connector coupled to a ground source;
the microphone detection circuitry operative to determine whether the received plug is the microphone type or the non-microphone type, the microphone detection circuitry including:
a bias power source, wherein the microphone connector is coupled to the bias power source;
a resistor having one end coupled to a node of the bias power source and another end coupled to the microphone connector; and
a transistor whose control electrode is coupled to said another end of the resistor, and whose output electrode provides a signal which indicates whether the received plug is the microphone type or the non-microphone type.

20. The system of claim 19, wherein the signal is a first signal, further comprising a separate HEADSET DETECT signal that indicates whether a plug is received by the jack.

21. The system of claim 20, wherein the jack comprises a headset detect switch electrically coupled to a power source and at least one of a right and a left connector of the jack, and further comprising a node coupled between the headset detect switch and the power source, the node provides the separate HEADSET DETECT signal that indicates whether a plug is received by the jack.

22. The system of claim 20, wherein the bias power source is part of CODEC circuitry to monitor the HEADSET DETECT signal and provide a bias power signal to the transistor in response to the HEADSET DETECT signal.

23. The system of claim 20 further comprising headset switch detection circuitry to monitor the microphone connector for a headset switch activation event and provide a further signal in response to a monitored headset switch activation event executed by a headset switch.

24. The system of claim 23, wherein the headset switch activation event is one of an open circuit event and a short circuit event.

25. The system of claim 23, wherein the headset switch is a first headset switch, wherein the headset switch activation event is a first headset switch activation event, wherein the microphone is electrically connected to a second headset switch, the headset switch detection circuitry to:
    monitor the plug for a second headset switch activation event executable by the second headset switch;
    change a state of the further signal in response to a monitored first headset switch activation event; and
    change a state of the further signal in response to a monitored second headset switch activation event.

26. The system of claim 19, wherein the bias power source is part of CODEC circuitry to:
    if the received plug has a microphone region in an anticipated microphone region, provide the bias power to a transistor operative to provide the signal; and
    if the received plug does not have a microphone region in the anticipated microphone region, electrically coupling the transistor to ground.

\* \* \* \* \*